United States Patent
Boss et al.

(10) Patent No.: US 7,956,747 B2
(45) Date of Patent: Jun. 7, 2011

(54) MANAGING ELECTRICAL DEVICE POWER STATE

(75) Inventors: Gregory J. Boss, Saginaw, MI (US);
Peter G. Finn, Brampton, CA (US);
Rick A. Hamilton, II, Charlottesville, VA (US); Brian M. O'Connell, Cary, NC (US); James W. Seaman, Falls Church, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/329,168

(22) Filed: Dec. 5, 2008

(65) Prior Publication Data

US 2010/0141431 A1    Jun. 10, 2010

(51) Int. Cl.
*G08B 13/14* (2006.01)
(52) U.S. Cl. .................. 340/572.1; 340/572.4
(58) Field of Classification Search .......... 340/572.1, 340/572.4, 539.13, 5.1, 7.32, 7.33, 7.36; 701/36; 320/132
See application file for complete search history.

(56) References Cited

U.S. PATENT DOCUMENTS

| | | | |
|---|---|---|---|
| 5,764,469 A * | 6/1998 | Slepian et al. | 361/92 |
| 5,790,946 A | 8/1998 | Rotzoll | |
| 6,525,648 B1 | 2/2003 | Kubler et al. | |
| 6,823,199 B2 | 11/2004 | Gough | |
| 6,850,824 B2 | 2/2005 | Breed | |
| 6,944,528 B2 | 9/2005 | Nagano | |
| 7,084,767 B2 * | 8/2006 | Hasegawa et al. | 340/572.1 |
| 7,205,890 B2 | 4/2007 | Defant et al. | |
| 7,400,243 B2 * | 7/2008 | Sumida et al. | 340/539.11 |

* cited by examiner

*Primary Examiner* — Toan N Pham
(74) *Attorney, Agent, or Firm* — Patrick J. Daugherty; Driggs, Hogg, Daugherty & Del Zoppo Co., LPA

(57) ABSTRACT

A system, method, and program product that manages the power state of a portable electrical device located within a monitored region about a vehicle. Information about the portable electrical device such as the power state of the portable electrical device is obtained and used to identify an action for the portable electrical device. Suitable actions include, but are not limited to, transitioning the power state of the portable electrical device and/or providing a notification about the portable electrical device. Other information such as the state of the ignition of the vehicle and/or the proximity of the driver and/or a passenger(s) with respect to the vehicle may additionally or alternatively be used to determine the action.

24 Claims, 3 Drawing Sheets

MANAGING ELECTRICAL DEVICE POWER STATE

FIELD OF THE INVENTION

The present invention generally relates to automobiles and, more particularly, to a method, system, and program product of an automobile that manages the power state of a portable electrical device.

BACKGROUND OF THE INVENTION

An automobile occupant such as a driver or a passenger may have a portable electrical device such as an electrically-powered game, a cell phone, a CD player, a DVD player, etc. in his/her possession when the occupant is in the automobile. Such a device can be turned on while the automobile is running and/or while the automobile is turned off.

If such a device is turned on and left in the automobile when all of the occupants of the automobile have exited the automobile, the device may undesirably consume power from the battery supplying power to the device and/or may become damaged due to the environment.

By way of example, such a device may undesirably consume power from one or more batteries installed in the device or from the vehicle's battery when the device is receiving power from the vehicle's battery. In another example, the temperature of the device may fall outside of the operating temperature range for the device, which may cause damage to one or more component of the device, as the temperature in the automobile changes.

SUMMARY OF THE INVENTION

In one aspect, an automobile control system manages the power state of a portable electrical device located in a region monitored by the automobile control system. The system includes a device identifier that identifies the presence of one or more portable electrical devices located in the region monitored by the system and obtains information about each of the one or more portable electrical devices. The system further includes an action identifier that identities an action for at least one of the portable electrical devices based on the information about the at least one of the portable electrical devices, wherein the action is indicative of a power state transition for the at least one of the portable electrical devices. The system further includes a controller that generates a signal indicative of the action to be performed.

In another aspect, a method manages the power state of a portable electrical device located in a region monitored by the automobile control system by a control system of the vehicle. The method includes identifying the presence of a portable electrical device within the region monitored by the system. The method further includes obtaining a first parameter indicative of the power state of the device and a second parameter indicative of the ignition state of the vehicle. The method further transitioning the power state of the device based on the first and second parameters.

In another aspect, a method includes producing computer executable program code, storing the code on a computer readable medium, and providing the program code to be deployed and executed on a computer system. The program code comprising instructions which, when executed on the computer system, cause the computer system to: scan for portable electrical devices located within a monitored region about a vehicle, notify an operator of the vehicle regarding upon detecting a portable electrical device in the region, turn the portable electrical device on, receive a signal indicative of a lower power state for the device, notify the operator regarding the lower power state and causing the portable electrical device to transition the lower power state based on the signal.

In another aspect, a method for deploying an application for facilitating fueling a vehicle includes providing a computer infrastructure being operable to: identify the current power state of the portable electrical device, infer a user desired power state, generate a signal indicating a new power state for the device when the current power state and the inferred power state are different, and transition the power state of the portable electrical device to the new power state based on the signal.

BRIEF DESCRIPTION OF THE DRAWINGS

These and other features of this invention will be more readily understood from the following detailed description of the various aspects of the invention taken in conjunction with the accompanying drawings in which.

Figure 1:
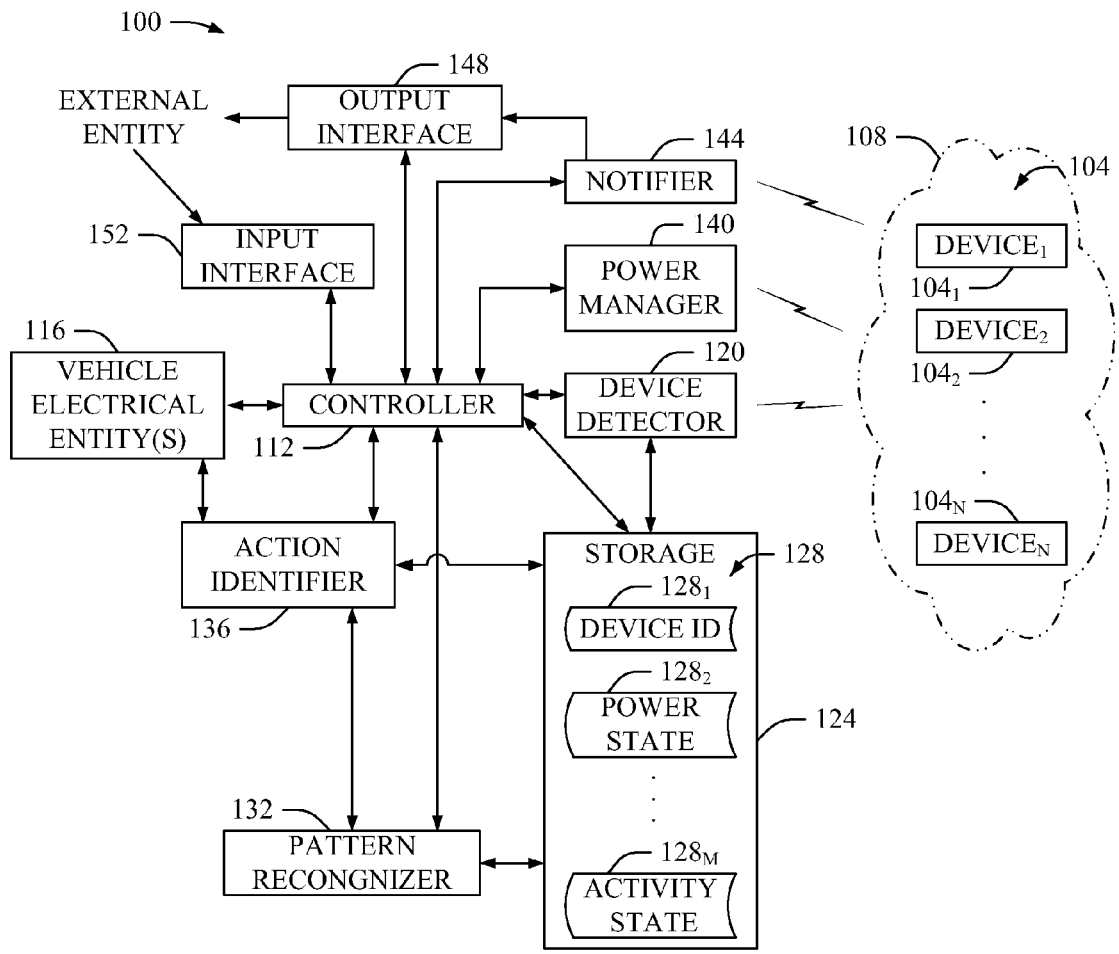
FIG. 1 illustrates a vehicle control system that manages the power state of a portable electrical device located within a region monitored by the system.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections
I. General Description
II. Computerized Implementation
I. General Description FIG. 1 illustrates a non-limiting example of a vehicle control system 100 that facilitates managing the power state of one or more portable electric devices 104 located within a region 108 monitored by the system 100. In one instance, the region 108 encompasses the entire vehicle. In another instance, the region 108 encompasses a sub-portion of the vehicle. Optionally, the region 108 additionally or alternatively encompasses a region outside of the vehicle. It is also noted that the particular shape of the illustrated region 108 is shown for explanatory purposes and is not limiting. As such, the region 108 may be otherwise shaped, including in two or three dimensional configurations. In addition, one or more other regions may be concurrently or alternately monitored by the system 100.

In the illustrated example, the system 100 manages the power state of N portable electric devices 104, device$_1$ 104$_1$, device$_2$ 104$_2$, . . . device$_N$ 104$_N$ (where N is an integer greater than or equal to one) located within the region 108. Examples of the one or more devices 104 include, but are not limited to, an electrically-powered game, a cell phone, a pager, an audio player, a video player, an electrically-powered toy, an electrical appliance, a digital watch, a personal data assistant, a mobile computer, a flashlight, and/or other devices that operate via electrical power supplied by one or more galvanic cells, solar cells, fuel cells, and/or the like.

The system 100 includes a controller 112, which may be a computer, a control module, a microprocessor, or the like. The controller 112 communicates with more or more components of the system 100 and, optionally, with one or more electrical entities 116 of the vehicle such as, but not limited to, a controller, a computer, a module, a microprocessor, a system, a subsystem, etc. of the vehicle. It is to be appreciated that the system 100 may be part of, include, or work in conjunction with a main computing system or computer of the vehicle.

In one non-limiting instance, the controller 112 communicates with the one or more electrical entities 116 of the vehicle to obtain information about the vehicle. For example, the controller 112 may communicate with the one or more electrical entities 116 of the vehicle to obtain information indicative of a state of the ignition system of the vehicle (e.g., off or on). In another non-limiting example, the controller 112 may communicate with the one or more electrical entities 116 of the vehicle to obtain information indicative of a state of the temperature inside of the vehicle. Other information about the vehicle may be obtained from the one or more electrical entities 116 of the vehicle.

The system 100 further includes at least one device detector 120 that detects that a device 104 is in the region 108. The device detector 120 may periodically, a periodically, or continuously scan the region 108 for devices 104. Additionally or alternatively, the controller 112 may invoke the device detector 120 to scan the region 108. For instance, the controller 112 may invoke the device detector 120 to scan the region 108 when the state of the ignition of the vehicle transitions and/or is in a particular state (e.g., on or off), the temperature in the vehicle is above and/or below a threshold temperature, etc.

In another instance, the controller 112 may invoke the device detector 120 to scan the region 108 based on the proximity of the operator and/or one or more passenger of the vehicle with respect to the vehicle. For instance, a key to the vehicle and/or an object with a person may include an emitter, transmitter, transceiver, or the like that conveys information indicative of a distance of the key or object to the vehicle and, thereby a distance of the person holding the key or object, from the vehicle. The controller 112 may use such information to determine whether to invoke the device detector 120 to scan the region 108 for devices 104.

Additionally or alternatively, a device 104 in the region 108 or an emitter affixed to the device 104 may emit a signal that is received by the device detector 120. In one non-limiting instance, this may occur in response to the device 104 being subjected to an electromagnetic field generated by the device detector 120. In another non-limiting instance, this may occur in response to a power state transition of the device 104. In another non-limiting instance, this may occur in response to a change in the activity state of the device 104. In another non-limiting instance, a combination of the above and/or other information may trigger emission of the signal by the device 104.

In one instance, the device detector 120 simply detects that a device 104 is in the region 108. In another instance, the device detector 120 obtains additional information about the device 104. Non-limiting examples of such information include the identify of the device, the type of device, the power state of the device (e.g., full or partial, including a percentage of the partial power), the owner of the device, the manufacturer of the device, an activity state of the device (e.g., in use (active) or not in use (inactive)), audio, video, dialed phone number, downloaded website address, length of time the device has been on, a game score, and/or other information about the device 104. When obtaining the power state of the device 104, the device detector 120 may also obtain information such as whether the power was on when the device 104 entered the region 108 or before the device 104 entered the region 108. The same holds for other information such as transitions in the activity of the device 104, etc.

It is to be appreciated that various communications technologies can be used to allow the device detector 120 and the devices 104 to communicate. For example, the device detector 120 may include a receiver or a transceiver that receives signals in one or more frequency bands, and the device 104 may include a transmitter, an emitter, or a transceiver that transmits signals in the one or more frequency bands. As such, the transceiver of the device identifier 120 can read signals transmitted by the transceiver of the device 104.

By way of non-limiting example, the device detector 120 may include a radio frequency identification (RFID) reader and the device 104 may include a RFID tag. Such a tag may emit a signal when in a field generated by the reader, and the signal may include various information, including, but not limited to, the information described herein. Optionally, the device 104 may include an RFID writer so that it can write to the tag to update information in the tag such as, but not limited to, the information indicative of the power state, the activity state, etc. of the device 104. Of course, other wireless technologies are also contemplated.

A storage component 124 of the system 100 stores some or all of the information about the device 104. In the illustrated example, the storage component 124 includes M storage regions 128 for storing obtained information, wherein M is greater than or equal to one. For sake of brevity, clarity and explanatory purposes, the illustrated storage component 124 includes a first storage region $128_1$ for storing a first parameter indicative of the device identification (ID), a second storage region $128_2$ for storing a second parameter indicative of the power state of the device 104, and a third storage region $128_M$ for storing a third parameter indicative of the activity state of the device 104. Examples of other information that can be stored in the storage component 124 include, but are not limited to, the state of the ignition, the temperature of in the vehicle, etc.

The information stored in the storage component 124 may be updated when the device detector 120 receives updated information about the devices 104. Newly obtained information may be written over or appended to previously stored information. Where the newly obtained information is added, the stored information may be used as a history of the devices that have been in the region 108. A date and/or time stamp and/or other indicia may be associated with the information.

In one instance, the device detector 120 notifies the controller 112 when it receives information about a device 104. Additionally or alternatively, a signal is sent to the device detector 120 when information is stored in the storage component 124. Additionally or alternatively, the controller 112 polls the storage component 124 to determine if information has been stored or updated since the last time it polled the storage component.

A pattern recognizer 132 of the system 100 recognizes patterns in the information stored in the storage component 124. For example, the pattern recognizer 132 may identify that a device 104 is turned on a large percentage of the time between 4:30 pm and 5:00 pm, Monday-Friday. In one instance, this may correspond to an occupant that turns his/her cell phone on on the way home from work in order to call his/her spouse to let her/him know that the occupant is on his/her way home. Other patterns for other types of devices may additionally or alternatively be identified. In one instance, the pattern recognizer 132 notifies the controller 112 when it recognizes a pattern. Additionally or alternatively, the controller 112 polls to the pattern recognizer 132 to determine if a pattern has been recognized. In another example of the system 100, the pattern recognizer 132 is omitted.

An action identifier 136 of the system 100 identifies an action for the system 100 based on at least one or more of the information stored in the storage component 124, the information from the vehicle electrical system 116, or the pattern information from the pattern identifier 132. Information such as user provided information and/or other information may additionally or alternatively be used. Examples of suitable actions include, but are not limited to, changing the power state of the device 104, providing a notification about the device 104, do nothing, etc. It is to be appreciated that the identified action may be to perform more than one action. For instance, the action may entail removing power from a human readable display of the device 104, deactivating some functionality of the device, and starting a timer that indicates when the device 104 will be turned off.

The action identifier 136 may use one or more look up tables (LUTs), machine learning, and/or other techniques when identifying an action based on such information. For instance, the action identifier 136 may map the information to an action in a LUT. In another instance, the action identifier 136 may use a priori knowledge, statistics, probabilities, classifiers, neural networks, inference engines, and/or the like to determine an action from the information. As shown, the action identifier 136 may be invoked by the controller 112 and receive information from the controller 112 and/or the vehicle electrical systems 116, the storage component 124, and/or the pattern recognizer 132.

A power manager 140 of the system 100 transmits a signal indicative of the identified action. The transmission may be unicast to the corresponding device 104 and/or broadcast for reception by any device 104 in the region 108. For a broadcast signal, the signal may include indicia that identifies the intended recipient device 104. In one instance, the signal may cause the action to occur. In another instance, the signal may invoke the device 104 to perform the action. In another instance, the device 104 receives the signal and determines whether to perform the action. For example, the user of the device 104 may have configured the device 104 to ignore actions provided by the system 100. In another example, the device 104 may include logic such as the machine learning techniques described herein to perform an action based on the received action, including perform a different action, perform the received action, or discard the action.

A notifier 144 of the system 100 transmits a signal indicative of the device 104. This signal may be transmitted in addition or alternatively to the signal indicative of the action. The transmission may be unicast to the device 104 and/or broadcast for reception by any device 104 in the region 108 as described in connection with the power manager 140. The notification may invoke the device 104 to respond with an audio and/or a visual notification, including a beep, a message, an alphanumeric character, a light pattern, etc. The device 104 may convey the notification via an output interface 148 of the device 104. Additionally or alternatively, the signal may be conveyed to an output interface 118 of the system 100. As such, the system 100 may respond with an audio and/or a visual notification, including a beep, a message, an alphanumeric character, a light pattern, etc. Additionally or alternatively, the signal may be conveyed to an external device such as a cell phone of the user, an email address, etc.

An input interface 152 of the system 100 allows communication from external entities such as a user, a computer, another vehicle, etc. to communicate with the controller 112. Such communication may include one or more configurations of actions, indicia to map information from a device 104 to a type of the device 104, rules for identifying an action, etc. It is to be appreciated that the input interface 152 may be configured to receive voice, manual, wirelessly transmitted, etc. input.

Figure 2:
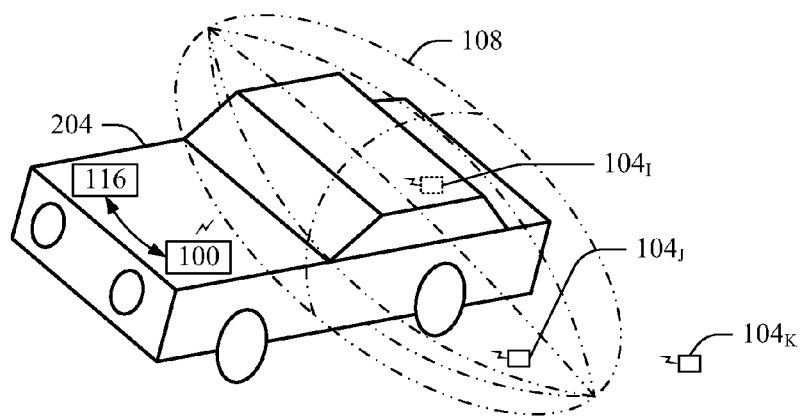
FIG. 2 illustrates an automobile having a system that manages the power state of a portable electrical device located within a region monitored by the system.

FIG. 2 illustrates an example in which the system 100 is employed in an automobile 204 in connection with the electrical system(s) 116 of the automobile 204. As illustrated, in this example the monitored region 108 covers a region of the vehicle and a region outside of the vehicle. A first portable electrical device$_I$ 104$_I$ is located in the vehicle 204 within the region 108. The second portable electrical device$_J$ 104$_J$ is located outside of the vehicle 204, but within the region 108. The third portable electrical device$_K$ 104$_K$ is located outside of the vehicle 204 and outside of the region 108. As such, the system 100 can communicate with and manage the power state of the first and second devices 104$_I$ and 104$_J$ as described above.

Figure 3:
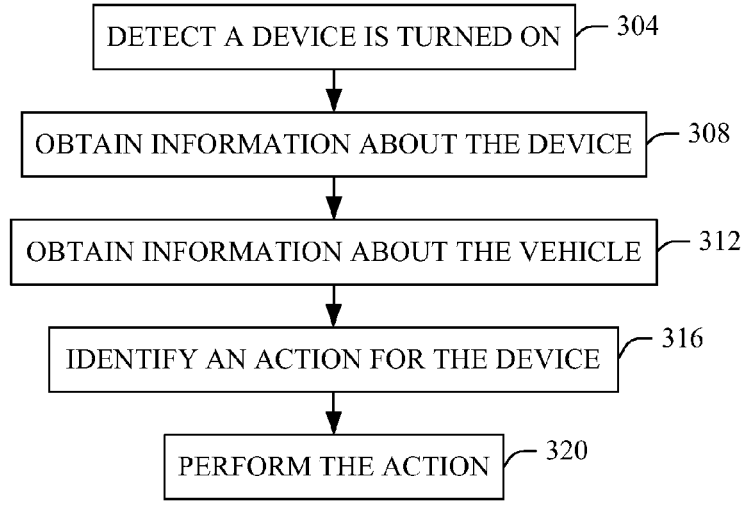
FIG. 3 illustrates a method that manages the power state of a portable electrical device.

FIG. 3 illustrates an example method for managing the power state of a portable electrical device. At reference numeral 304, a portable electrical device 104 within the monitored region 108 is detected. At 308, information about the device 104 is obtained. At discussed herein, such information includes, but is not limited to, a first parameter that identifies the device, a second parameter that indicates a power state of the device, a third parameter that indicates an activity state of the device, etc.

At 312, information about the vehicle and/or an occupant of the vehicle is obtained. As discussed herein, such information includes, but is not limited to, the ignition state of the vehicle, a temperature in the vehicle, the proximity of the operator to the vehicle, etc. At 316, an action for the device is identified based on the information about the device, the information about the vehicle, the information about the occupant. At 320, the action is performed. As discussed herein, suitable actions include, but are not limited to, transitioning the power state of the device and/or providing a notification about the device, etc.

Figure 4:
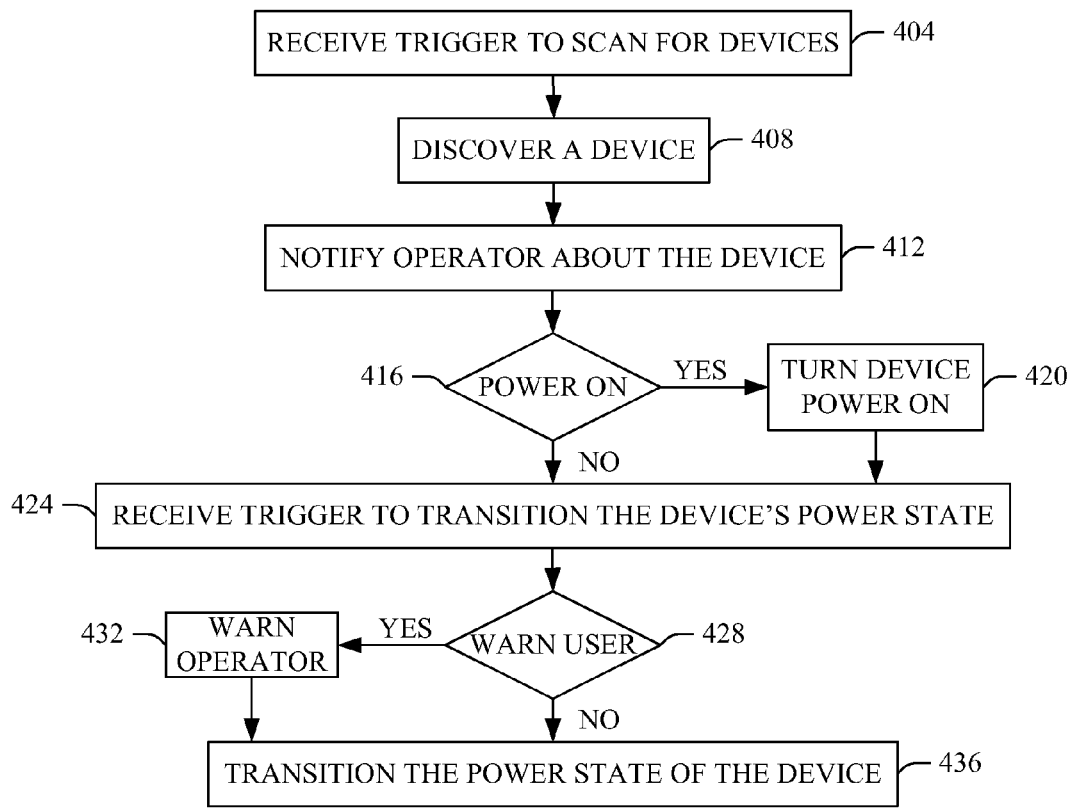
FIG. 4 illustrates a method that manages the power state of a portable electrical device.

FIG. 4 illustrates an example flow diagram for managing the power state of a portable electrical device. At 404, a trigger that invokes scanning for devices in a monitored region is received. As discussed herein, suitable triggers include, but are not limited to, transitioning the state of the ignition of the vehicle (e.g., from on to off or an intermediate position, off to on or an intermediate position, and from an intermediate position to off or on), detecting an occupant is approaching or leaving, sensing a time duration has lapsed, receiving a command, etc. At 408, devices within the monitored region are discovered. As discussed herein, this may include scanning the monitored region for devices, receiving such information, etc. The information obtained may include information for a device in an off, partial power, or full power state.

At 412, the operator is notified regarding any discovered devices. Such notification may include an audio and/or visual notification from the vehicle and/or the device. At 416, it is determined whether the device should be turned on. If it is determined that the device should be powered on, then at 420 the device is powered on. At 424, a trigger that indicates that the power state of the device should be transitioned is received. As discussed herein, suitable triggers include, but are not limited to, transitioning the state of the ignition of the vehicle (e.g., from on to off or an intermediate position, off to on or an intermediate position, and from an intermediate position to off or on), detecting an operator is approaching or leaving, sensing a time duration has lapsed, receiving a command, etc.

At 428, it is determined whether the user should be warned about the device. For instance, if the device is on, the user may be warned that the device is on. If it is determined that the user should be warned, then at 432, the user is warned. As discussed herein, the user may be warned via an audible or visual warning from the vehicle, the device, and/or another device (e.g., an email, a page, a text message, etc.). In one instance, this allows the user to inhibit the transition of the power state. For example, the user may remove the device from within the region 108, provide an override signal, etc. At 436, the power state of the device is transitioned. It is to be appreciated that the power state may be transitioned to an off, a standby, a sleep, a low power, a hibernate, etc. state.

Figure 5:
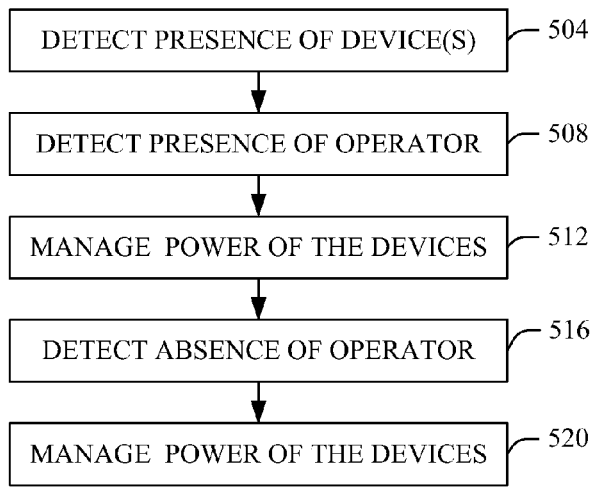
FIG. 5 illustrates a method that manages the power state of a portable electrical device.

FIG. 5 illustrates an example method for managing the power state of a portable electrical device. At reference numeral 504, the presence of a device within a first monitored region is detected as described herein. At 508, the presence of an operator within a second monitored region is detected as described herein. At 512, the power of the devices is managed based on the presence of the operator. At 516, the absence of the operator within the second monitored region is detected as described herein. At 520, the power of the devices is managed based on the absence of the operator.

Although the above has been described in the context of a vehicle such as an automobile, it is to be understood that the systems and methods described herein and variations thereof can be in other applications. In general, the systems and methods can be implemented in other types of vehicles and/or in any computing system. For example, a mobile computing system such as a hand held computer, a watch, a cell phone, etc. can be used to manage the power state of one or more devices in a monitored region.

II. Computerized Implementation

Figure 6:
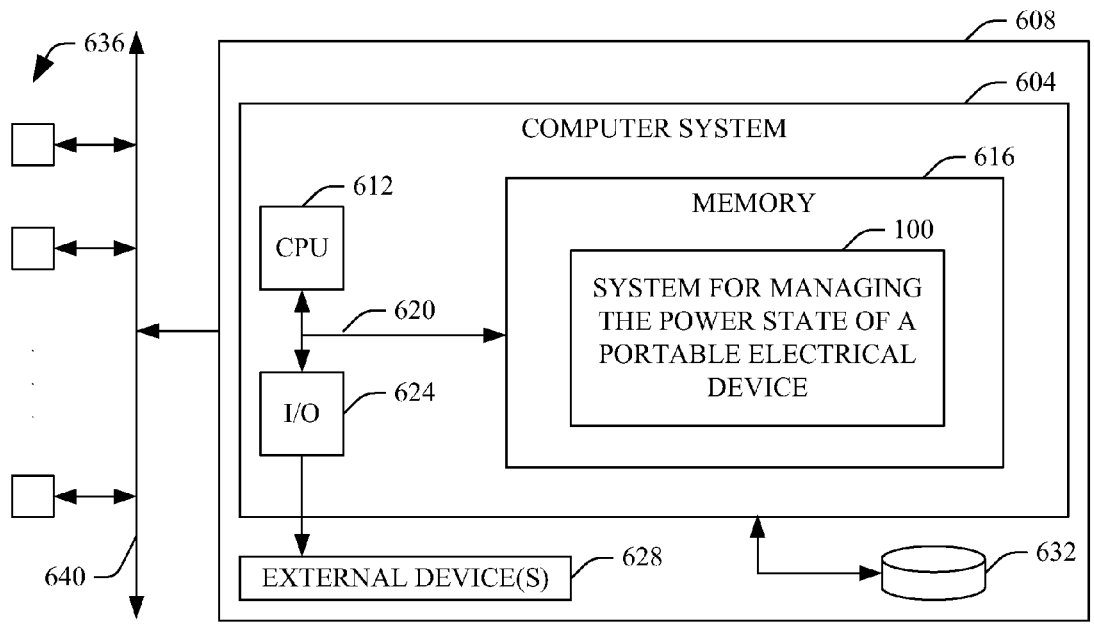
FIG. 6 illustrates an exemplary computerized implementation of the systems and methods.

Referring now to FIG. 6, an exemplary computerized implementation includes a computer system 604 deployed within a computer infrastructure 608 such as one existing with a vehicle as described herein. This is intended to demonstrate, among other things, that the present invention could be implemented within a network environment (e.g., the Internet, a wide area network (WAN), a local area network (LAN), a virtual private network (VPN), etc.), or on a stand-alone computer system.

In the case of the former, communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 608 is intended to demonstrate that some or all of the components of implementation could be deployed, managed, serviced, etc. by a service provider who offers to implement, deploy, and/or perform the functions of the present invention for others.

As shown, the computer system 604 includes a processing unit 612, a memory 616, a bus 620, and input/output (I/O) interfaces 624. Further, the computer system 604 is shown in communication with external I/O devices/resources 628 and storage system 632. In general, the processing unit 612 executes computer program code, such as the code to implement various components of the system 100, which is stored in memory 616 and/or storage system 632. It is to be appreciated that two or more, including all, of these components may be implemented as a single component.

While executing computer program code, the processing unit 612 can read and/or write data to/from the memory 616, the storage system 632, and/or the I/O interfaces 624. The bus 620 provides a communication link between each of the components in computer system 604. The external devices 628 can comprise any devices (e.g., keyboard, pointing device, display, etc.) that enable a user to interact with computer system 604 and/or any devices (e.g., network card, modem, etc.) that enable computer system 604 to communicate with one or more other computing devices.

The computer infrastructure 608 is only illustrative of various types of computer infrastructures for implementing the invention. For example, in one embodiment, computer infrastructure 608 comprises two or more computing devices (e.g., a server cluster) that communicate over a network to perform the various process steps of the invention. Moreover, computer system 604 is only representative of various possible computer systems that can include numerous combinations of hardware.

To this extent, in other embodiments, computer system 604 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively.

Moreover, the processing unit 612 may comprise a single processing unit, or be distributed across one or more processing units in one or more locations, e.g., on a client and server. Similarly, the memory 616 and/or the storage system 632 can comprise any combination of various types of data storage and/or transmission media that reside at one or more physical locations.

Further, I/O interfaces 624 can comprise any system for exchanging information with one or more of the external device 628. Still further, it is understood that one or more additional components (e.g., system software, math co-processing unit, etc.) not shown in FIG. 6 can be included in computer system 604. However, if computer system 604 comprises a handheld device or the like, it is understood that one or more of the external devices 628 (e.g., a display) and/or the storage system 632 could be contained within computer system 604, not externally as shown.

The storage system 632 can be any type of system (e.g., a database) capable of providing storage for information under the present invention. To this extent, the storage system 632 could include one or more storage devices, such as a magnetic disk drive or an optical disk drive. In another embodiment, the storage system 632 includes data distributed across, for example, a local area network (LAN), wide area network (WAN) or a storage area network (SAN) (not shown). In addition, although not shown, additional components, such as cache memory, communication systems, system software, etc., may be incorporated into computer system 604.

Shown in the memory 616 of computer system 604 is the system 100, which includes the components and performs the functions discussed above. In the illustrated embodiment, the system 100 communicates with external entities 636 such as another vehicle computing system, an external system communicating with the controller 112, other apparatuses external to the vehicle, etc. over a path 640, which may be wired (as shown) or wireless.

While shown and described herein as a method and a system, it is understood that the invention further provides various alternative embodiments. For example, in one embodiment, the invention provides a computer-readable/useable medium that includes computer program code to enable a computer infrastructure to perform the process steps of the invention. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 616 (FIG. 6) and/or the storage system 632 (FIG. 6) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider could offer to manage the system 100. In this case, the service provider can create, maintain, support, etc., a computer infrastructure, such as the computer infrastructure 608 (FIG. 6) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing the system 100. In this case, a computer infrastructure, such as computer infrastructure 608 (FIG. 6), can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 604 (FIG. 6), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" of a plurality of elements, a "primary" distinguished from a "secondary," an "another", etc.). Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A system, comprising:
 a device detector configured to monitor a particular region about a vehicle, detect one or more portable electrical devices located in the region, and obtain information about each of the one or more portable electrical devices;
 an action identifier configured to identify an action for at least one of the portable electrical devices based on the information about the at least one of the portable electrical devices, wherein the action is indicative of a power state transition for the at least one of the portable electrical devices; and
 a controller configured to generate a signal indicative of the action to be performed.

2. The system of claim 1, wherein the information about the portable electrical devices includes a current power state of the portable electrical device.

3. The system of claim 2, wherein the information about the portable electrical devices further includes an identification of the portable electrical device and an activity state of the portable electrical device, wherein the activity state indicates whether the portable electrical device is actively being used.

4. The system of claim 3, further including a power manager configured to transition the power state of the device based on the signal.

5. The system of claim 4, further including:
 a notifier configured to generate a notification about the portable electrical device based on the signal; and
 an output interface configured to present the notification to an operator of the vehicle.

6. The system of claim 3, further including a power manager configured to convey the signal to the portable electrical device.

7. The system of claim 6, further including a notifier configured to generate a notification about the portable electrical device based on the signal, wherein the notifier is configured to convey the notification to the portable electrical device.

8. The system of claim 1, wherein the device detector includes a radio frequency identification (RFID) reader configured to read a RFID tag affixed to the portable electrical device, wherein the information about the portable electrical device is included in the RFID tag.

9. The system of claim 1, wherein the device detector includes a wireless communication interface configured to wirelessly communicate with a wireless communication interface of the portable electrical device, wherein the information about the device is obtained from the portable electrical device through the wireless communication and the wireless communication includes at least one of Bluetooth, WIMAX, WIFI, or Zigbee.

10. The system of claim 1, wherein the system is part of the vehicle's control system.

11. The system of claim 1, further including a pattern recognizer configured to recognize a pattern from the information about the portable electrical devices, wherein the action is based on the pattern.

12. The system of claim 1, wherein the monitored region includes a sub-region of the vehicle and a sub-region of the environment external to the vehicle, wherein the vehicle is an automobile.

13. A method for managing a power state of a portable electrical device, comprising:
    identifying a portable electrical device within a monitored region about a vehicle;
    obtaining a first parameter indicative of the power state of the device;
    obtaining a second parameter indicative of an ignition state of the vehicle;
    setting the power state of the device based on the first and second parameters.

14. The method of claim 13, further including obtaining a third parameter indicative of a proximity of an operator of the vehicle to the vehicle.

15. The method of claim 14, further including setting the power state of the device based on the first, second and third parameters.

16. The method of claim 14, further including scanning for portable electrical device based on the proximity.

17. The method of claim 13, further including scanning for portable electrical device based on the state of the ignition.

18. The method of claim 13, wherein the action includes turning the portable electrical device on.

19. The method of claim 13, wherein the action includes turning the portable electrical device off.

20. The method of claim 19, wherein the device is turned off after lapse of a preset delay.

21. The method of claim 13, further including notifying the operator about the state of the device.

22. The method of claim 13, wherein the vehicle is an automobile.

23. A method, comprising:
    producing computer executable program code;
    storing the code on a computer readable medium; and
    providing the program code to be deployed and executed on a computer system; the program code comprising instructions which, when executed on the computer system, cause the computer system to:
    scan for portable electrical devices located within a region about a vehicle;
    notify an operator of the vehicle about a portable electrical device in the region upon detecting the portable electrical device;
    turn the portable electrical device on;
    receive a signal indicative of a lower power state for the device;
    notify the operator regarding the lower power state; and
    directing the portable electrical device to transition the lower power state based on the signal.

24. A method for deploying an application for managing a power state of a portable electrical device, comprising:
    providing a computer infrastructure being operable to:
    wirelessly communicate with a portable electrical device located within a monitored region about a vehicle;
    identify a current power state of the portable electrical device;
    infer a user desired power state;
    generate a signal indicating a new power state for the device when the current power state and the inferred power state are different; and
    transition the power state of the portable electrical device to the new power state based on the signal.

* * * * *